(12) United States Patent
Morijiri et al.

(10) Patent No.: US 7,354,989 B2
(45) Date of Patent: Apr. 8, 2008

(54) THIOEPOXY BASED POLYMERIZABLE COMPOSITION AND METHOD FOR PRODUCTION THEREOF

(75) Inventors: Hiroyuki Morijiri, Omuta (JP); Seiichi Kobayashi, Omuta (JP); Chitoshi Shimakawa, Omuta (JP); Akinori Ryu, Omuta (JP); Nobuo Kawato, Omuta (JP)

(73) Assignee: Mitsui Chemicals, Inc., Tokyo (JP)

( * ) Notice: Subject to any disclaimer, the term of this patent is extended or adjusted under 35 U.S.C. 154(b) by 520 days.

(21) Appl. No.: 10/506,033

(22) PCT Filed: Mar. 11, 2003

(86) PCT No.: PCT/JP03/02836

§ 371 (c)(1),
(2), (4) Date: Aug. 30, 2004

(87) PCT Pub. No.: WO03/076496

PCT Pub. Date: Sep. 18, 2003

(65) Prior Publication Data

US 2005/0124783 A1    Jun. 9, 2005

(30) Foreign Application Priority Data

Mar. 12, 2002   (JP)   ............... 2002-067015

(51) Int. Cl.
C08G 75/00 (2006.01)
C08G 75/12 (2006.01)
C08G 75/14 (2006.01)
C08L 81/00 (2006.01)

(52) U.S. Cl. ............... 528/373; 528/403; 525/523; 525/535

(58) Field of Classification Search ............... 525/523, 525/535; 528/373, 403, 480
See application file for complete search history.

(56) References Cited

U.S. PATENT DOCUMENTS

| | | | |
|---|---|---|---|
| 4,775,733 A | 10/1988 | Kanemura et al. | |
| 5,374,668 A | 12/1994 | Kanemura et al. | |
| 5,807,975 A | 9/1998 | Amagai et al. | |
| 6,204,311 B1 * | 3/2001 | Morijiri et al. | 523/400 |
| 6,300,464 B2 * | 10/2001 | Morijiri et al. | 528/373 |
| 6,458,917 B2 * | 10/2002 | Morijiri et al. | 528/373 |
| 2001/0002413 A1 | 5/2001 | Morijiri et al. | |

FOREIGN PATENT DOCUMENTS

| | | |
|---|---|---|
| EP | 942027 A2 | 9/1999 |
| EP | 1 316 555 A1 | 6/2003 |
| JP | 63-46213 A | 2/1988 |
| JP | 9-110979 A | 4/1997 |
| JP | 11-322930 A | 11/1999 |
| JP | 2000-186087 A | 7/2000 |
| JP | 2001-163872 A | 6/2001 |
| JP | 2001-163873 * | 6/2001 |
| JP | 2001-288181 A | 10/2001 |
| WO | 89/10575 A1 | 11/1989 |

OTHER PUBLICATIONS

Machine translation of JP 2001-163873, provided by the JPO website.*
Machine translation of JP 2001-163872, provided by the JPO website.*
Bonnans-Plaisance et al., "Functional polythiiranes: 3. Synthesis and characterization of polythiiranes containing biphenyl units in the side chain," *Polymer*, 1993, pp. 2003-2006, vol. 34, No. 9, Butterworth-Heinemann Ltd. XP-002345197.

* cited by examiner

*Primary Examiner*—Michael J. Feely
(74) *Attorney, Agent, or Firm*—Buchanan Ingersoll & Rooney PC

(57) ABSTRACT

A polymerizable composition and a manufacturing method thereof are provided, in which the composition is capable of meeting requirements of overcoming decrease in production yield of a resin composed of a thioepoxy compound, the decrease being caused by variations in refractive index, hue, and optical strain.

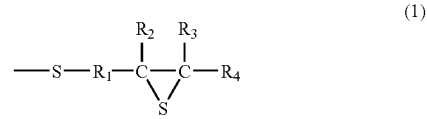

In a polymerizable composition containing a compound having at least one structure represented by the above formula (where $R_1$ represents a hydrocarbon having 1 to 10 carbon atoms, $R_2$, $R_3$, and $R_4$ each represent a hydrocarbon group having 1 to 10 carbon atoms or a hydrogen atom.), the total of a thioepoxy compound A, which has at least one structure represented by formula (2) and at least one structure represented by formula (3), and a thioepoxy compound B, which has at least one structure represented by formula (4) and at least one structure represented by formula (3), is 4 mass percent or less with respect to the total mass of the polymerizable composition.

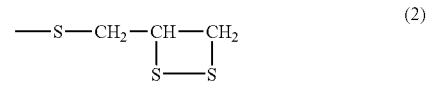

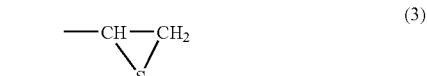

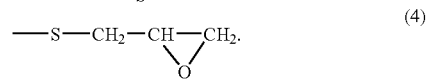

9 Claims, No Drawings

THIOEPOXY BASED POLYMERIZABLE COMPOSITION AND METHOD FOR PRODUCTION THEREOF

TECHNICAL FIELD

The present invention relates to thioepoxy compounds and cured resins obtained therefrom, which thioepoxy compounds are preferably used in resin fields of optical materials or the like which are required to have a high refractive index and high transparence.

BACKGROUND ART

Since being lighter and less brittle than inorganic lenses, and being dyeable, in recent years, plastic lenses have been increasingly in demands for optical elements such as glass lenses and camera lenses.

Among properties which have been required for those plastic lenses, a high refractive index and a high Abbe number are required as optical properties, and high heat resistance and low specific gravity are required as physical properties.

At present, as a resin which has satisfied those requirements mentioned above to some extent, for example, a polythiourethane resin which contains sulfur atoms therein has been known. Since having a high refractive index, superior impact resistance, and the like, the polythiourethane resin has been regarded as a well-balanced resin (for example, referred to Japanese Unexamined Patent Application Publication No. 63-46213).

However, although a higher refractive index and a higher Abbe number have been further required, it has been very difficult to improve the above two requirements at the same time since in the relationship between the two properties described above, as the refractive index is increased, the Abbe number is decreased. Hence, researches have been aggressively carried out so that the refractive index is increased while the decrease in Abbe number is suppressed.

Among the researches mentioned above, a method using a thioepoxy compound may be a typical proposal (for example, referred to WO-89/10575 and Japanese Unexamined Patent Application Publication No. 9-110979).

According to the methods mentioned above, while having a relatively high Abbe number, the resin is able to have a high refractive index. However, due to variation in quality of polymerizable compounds used as a raw material, which occurs in industrial manufacturing thereof, resins formed by the methods described above may have unstable refractive indexes or hues in some cases, and in addition, optical strain may be liable to be generated in some cases. In the case in which the refractive index varies, a problem may arise in that when a resin is used for a lens, power of lens may vary. In the case in which the hue varies, a problem may arise in that when a resin is used for glass lenses, a pair of lenses may be formed which have different colors from each other. Among resins used for optical applications, a resin having optical strain is rejected as a defective product. Accordingly, when optical strain becomes liable to be generated, the production yield of the resin is significantly decreased, resulting in industrial disadvantages. Hence, reasons causing the variations in refractive index, hue, and optical strain must have been clearly understood.

DISCLOSURE OF INVENTION

In order to solve the problems described above, through intensive research carried out by the inventors of the present invention on compounds which are by-produced when a thioepoxy compound is manufactured, the behavior of the compounds could be successfully grasped. That is, it was found that a thioepoxy compound A, which has at least one structure represented by formula (2) and at least one structure represented by formula (3), and a thioepoxy compound B, which has at least one structure represented by formula (4) and at least one structure represented by formula (3), cause the variation in refractive index, hue, and optical strain of a resin. In addition, as for the acceptable amount of the compounds described above, it was also found at the same time that when the total amount of the thioepoxy compound A and the thioepoxy compound B is 0 with respect to the total mass of a polymerizable composition, no problems occur at all, and that when the total amount is 4 mass percent or less, the refractive index and the hue of an obtained resin are stabilized and the optical strain is unlikely to be generated.

In addition, as for a polymerizable composition having at least one structure represented by formula (1) according to the present invention, an industrial manufacturing method have been studied so that the total of the thioepoxy compound A and the thioepoxy compound B is 4 mass percent or less with respect to the total mass of the polymerizable composition. As a result, it was found that when purification is performed by column chromatography using a silica gel column or the like, the total of the thioepoxy compound A and the thioepoxy compound B contained in an obtained polymerizable composition can be decreased; however, this can only be performed experimentally, and from an industrial point of view, separation performed by chromatography is not preferable in terms of cost and efficiency. Hence, study primarily focused on an industrially available manufacturing method has been further carried out by the inventors. As a result, it was found that by the following manufacturing methods or by the combination thereof, an industrial method for manufacturing a polymerizable composition can be obtained in which the total of the thioepoxy compound A and the thioepoxy compound B is 4 mass percent or less with respect to the total mass of the polymerizable composition, and hence the present invention was made. As the above manufacturing methods, for example, there may be mentioned a method in which the amount of a thiation agent, which is used in forming a compound having at least one structure represented by formula (1), is limited, that is, the amount of a thiation agent used for forming a known polythioepoxy compound is set in the range of from 0.9 to 1.3 equivalents with respect to one epoxy equivalent of the polythioepoxy compound; a method in which the amount of an acid or the anhydride thereof is limited, that is, the amount of an acid or the anhydride thereof is set to 0.2 equivalents or less with respect to one epoxy equivalent of the polythioepoxy compound; and in addition, a method in which the reaction temperature is controlled in the range of from 0° C. to 50° C.

That is, the present invention is as follows.

[1] In a polymerizable composition which comprises a compound having at least one structure represented by formula (1):

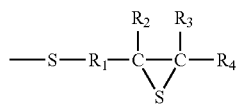
(1)

(Where $R_1$ represents a hydrocarbon having 1 to 10 carbon atoms, $R_2$, $R_3$, and $R_4$ each represent a hydrocarbon group having 1 to 10 carbon atoms or a hydrogen atom.), the total of a thioepoxy compound A, which has at least one structure represented by formula (2) and at least one structure represented by formula (3), and a thioepoxy compound B, which has at least one structure represented by formula (4) and at least one structure represented by formula (3), is 4 mass percent or less with respect to the total mass of the polymerizable composition.

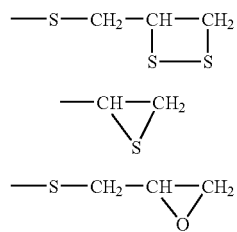

[2] In the polymerizable composition described in [1], the thioepoxy compound A is a compound represented by formula (5), the thioepoxy compound B is a compound represented by formula (6), and the compound having at least one structure represented by formula (1) is a compound represented by formula (7).

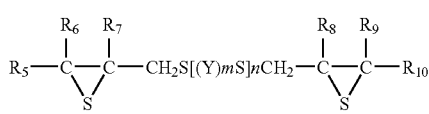

(where Y represents a substituted or unsubstituted, linear, branched, or cyclic divalent aliphatic hydrocarbon group having 1 to 10 carbon atoms, a substituted or unsubstituted 1,4-dithiane group, an arylene group, or an aralkylene group. m represents an integer of 0 to 2, and n represents an integer of 0 to 4.)

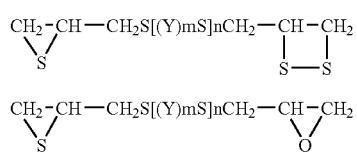

(where $R_5$ to $R_{10}$ each represent a hydrocarbon group having 1 to 10 carbon atoms or hydrogen. Y represents a substituted or unsubstituted, linear, branched, or cyclic divalent hydrocarbon group having 1 to 10 carbon atoms, a substituted or unsubstituted 1,4-dithiane group, an arylene group, or an aralkylene group. m represents an integer of 0 to 2, and n represents an integer of 0 to 4.)

[3] In the polymerizable composition described in [1] or [2], the thioepoxy compound A comprises 2,3-epidithiopropyl (2,3-epithiopropyl)disulfide and/or 2,3-epidithiopropyl(2,3-epithiopropyl)sulfide, the thioepoxy compound B comprises 2,3-epoxypropyl(2,3-epithiopropyl)disulfide and/or 2,3-epoxypropyl(2,3-epithiopropyl)sulfide, and the compound having at least one structure represented by formula (1) comprises bis(2,3-epithiopropyl)disulfide and/or bis(2,3-epithiopropyl)sulfide.

[4] A method for manufacturing a polymerizable composition, comprises forming a polythioepoxy compound from a polyepoxy compound, wherein a thiation agent in an amount of 0.9 to 1.3 equivalents is used with respect to one epoxy equivalent of the polyepoxy compound so that the total of a thioepoxy compound A and a thioepoxy compound B, which are in formula (1), is 4 mass percent or less with respect to the total mass of the polymerizable composition.

[5] A method for manufacturing a polymerizable composition, comprises forming a polythioepoxy compound from a polyepoxy compound, wherein a thiation agent in an amount of 0.9 to 1.3 equivalents is used with respect to one epoxy equivalent of the polyepoxy compound, and the reaction temperature is set to 0° C. to 50° C. so that the total of a thioepoxy compound A and a thioepoxy compound B, which are in formula (1), is 4 mass percent or less with respect to the total mass of the polymerizable composition.

[6] A method for manufacturing a polymerizable composition, comprises forming a polythioepoxy compound from a polyepoxy compound, wherein a thiation agent in an amount of 0.9 to 1.3 equivalents is used with respect to one epoxy equivalent of the polyepoxy compound, an acid or the anhydride thereof in an amount of 0.2 equivalents or less is used with respect to one epoxy equivalent of the polyepoxy compound, and the reaction temperature is set to 0° C. to 50° C. so that the total of a thioepoxy compound A and a thioepoxy compound B, which are in formula (1), is 4 mass percent or less with respect to the total mass of the polymerizable composition.

[7] In the manufacturing method described in one of [4] to [6], the thioepoxy compound A is a compound represented by formula (5), the thioepoxy compound B is a compound represented by formula (6), and a compound having at least one structure represented by formula (1) is a compound represented by formula (7).

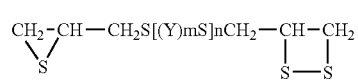

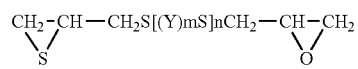

(where Y represents a substituted or unsubstituted, linear, branched, or cyclic divalent aliphatic hydrocarbon group having 1 to 10 carbon atoms, a substituted or unsubstituted 1,4-dithiane group, an arylene group, or an aralkylene group. m represents an integer of 0 to 2, and n represents an integer of 0 to 4.)

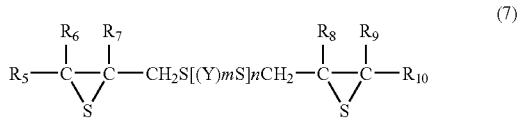

(where $R_5$ to $R_{10}$ each represent a hydrocarbon group having 1 to 10 carbon atoms or hydrogen. Y represents a substituted or unsubstituted, linear, branched, or cyclic divalent hydrocarbon group having 1 to 10 carbon atoms, a substituted or unsubstituted 1,4-dithiane group, an arylene group, or an aralkylene group. m represents an integer of 0 to 2, and n represents an integer of 0 to 4.)

[8] In the manufacturing method described in [7], the thioepoxy compound A comprises 2,3-epidithiopropyl(2,3-epithiopropyl)disulfide and/or 2,3-epidithiopropyl(2,3-epithiopropyl)sulfide, the thioepoxy compound B comprises 2,3-epoxypropyl(2,3-epithiopropyl)disulfide and/or 2,3-epoxypropyl(2,3-epithiopropyl)sulfide, and the compound having at least one structure represented by formula (1) comprises bis(2,3-epithiopropyl)disulfide and/or bis(2,3-epithiopropyl)sulfide.

[9] A method for manufacturing an optical material, wherein the optical material is obtained using the polymerizable composition described in one of [1] to [3] and/or the polymerizable composition obtained by the method described in one of [4] to [8].

[10] In the manufacturing method described in [9], the optical material comprises a lens.

[11] In the manufacturing method described in [10], cast polymerization is performed.

[12] A lens is formed by the method described in [11].

BEST MODE FOR CARRYING OUT THE INVENTION

In a polymerizable composition comprising a thioepoxy compound having at least one structure represented by formula (1), according to the present invention, the total content of a thioepoxy compound A, which has at least one structure represented by formula (2) and at least one structure represented by formula (3), and a thioepoxy compound B, which has at least one structure represented by formula (4) and at least one structure represented by formula (3), is 4 mass percent or less with respect to the total mass of the polymerizable composition, and preferably, 2 mass percent or less. When the total content is 1.5 mass percent or less, it is more preferable. When the polymerizable composition is manufactured in this range, the refractive index and the hue of a resin to be formed are stabilized, and the optical strain is unlikely to be generated.

In formula (1), $R_1$ represents a divalent hydrocarbon group having 1 to 10 carbon atoms, and in particular, there may be mentioned a linear, branched, or cyclic alkylene group having 1 to 10 carbon atoms; an arylene group having 6 to 10 carbon atoms such as phenylene, alkyl substituted phenylene, and naphthalene; or an aralkylene group having 7 to 10 carbon atoms, which is a combination of an alkylene group and an arylene group. Among those mentioned above, an alkylene group having 1 to 10 carbon atoms is preferable. When methylene or ethylene is used, it is preferable. When methylene is used, it is even more preferable. $R_2$, $R_3$, and $R_4$ each represent a hydrogen atom or a monovalent hydrocarbon group having 1 to 10 carbon atoms, and as the monovalent hydrocarbon having 1 to 10 carbon atoms, for example, a linear, branched, or cyclic alkyl group having 1 to 10 carbon atoms, an aryl group having 6 to 10 carbon atoms, or an aralkyl group having 7 to 10 carbon atoms may be mentioned. Among those mentioned above, a hydrogen atom or an alkylene group having 1 to 10 carbon atoms is preferable. When a hydrogen atom or a methyl group is used, it is more preferable. When a hydrogen atom is used, it is even more preferable.

As the compound having at least one structure represented by formula (1), a compound primarily represented by formula (7) shown below is preferable.

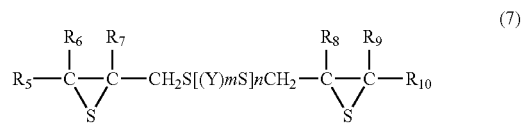

(Where $R_5$ to $R_{10}$ each represent a hydrocarbon group having 1 to 10 carbon atoms or hydrogen. Y represents a substituted or unsubstituted, linear, branched, or cyclic divalent aliphatic hydrocarbon having 1 to 10 carbon atoms, a substituted or unsubstituted 1,4-dithiane group, an arylene group, or an aralkylene group. m represents an integer of 0 to 2, and n represents an integer of 0 to 4.)

In the above formula, $R_5$ to $R_{10}$ each have the same meaning as that of $R_2$ to $R_4$ described above and, in particular, are each preferably a hydrogen atom. Y represents a substituted or unsubstituted, linear, branched, or cyclic divalent aliphatic hydrocarbon having 1 to 10 carbon atoms, a substituted or unsubstituted 1,4-dithiane group, an arylene group, or an aralkylene group. As the divalent aliphatic hydrocarbon having 1 to 10 carbon atoms, a linear, branched, or cyclic alkylene group having 1 to 10 carbon atoms is preferable, and a linear alkylene group is particularly preferable. As the arylene and the aralkylene groups mentioned above, the same as those described for $R_1$ may be mentioned by way of example. In addition, Y may have a substituent group, and the substituent group is not specifically limited as long as properties (such as transparence, uniformity, refractive index, and heat resistance) of a resin manufactured from the compound described above are not adversely influenced thereby, and the substituent group may comprise a reactive group. A compound having the structure represented by formula (1), and, in particular, a compound may be used which has at least three functionalities and which comprises a 2,3-epithiopropylthio group as a substituent group; however, a compound having two functionalities is more preferable. Furthermore, a compound in which n=0 is satisfied and/or a compound in which m=0 and n=1 are satisfied is most preferable.

The thioepoxy compound having at least one intramolecular structure represented by formula (1), according to the present invention, such as a polythioepoxy compound represented by formula (7), can be derived from a polyepoxy compound having at least two functionalities. The polyepoxy compound can be easily obtained by a known method. For example, when a polythiol compound having a linear or branched alkyl sulfide structure; hydrogen sulfide, sodium hydrosulfide, or sodium sulfide; and an epihalohydrine compound, preferably, epichlorohydrine or epibromohydrine, are allowed to react with each other under the presence of an alkali agent, an alkyl sulfide type epoxy compound represented by formula (8) is obtained.

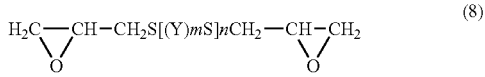

(8)

(Where, Y, m, and n are the same as those described above.)

When the epoxy compound thus obtained is allowed to react with a thiation agent selected, for example, from one of thiocyanic acid salts, thioureas, and triphenylphosphine sulfide, a polythioepoxy compound represented by formula (9) is obtained. Among the thiation agents used in this step, thiocyanic acid salts and thioureas are preferable. In consideration of reaction performance and cost, thiourea is more preferable.

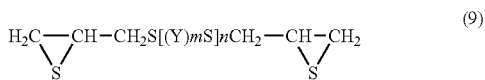

(9)

(Where, Y, m, and n are the same as those described above.)

As particular examples of polythiol compounds used as a starting material, for example, there may be mentioned aliphatic thiols such as 1,1-methanedithiol, 1,2-ethanedithiol, 1,2-propanedithiol, 1,3-propanedithiol, 2,2-propanedithiol, 1,4-butanedithiol, 1,2,3-trimercaptopropane, tetrakis(mercaptomethyl)methane, 1,2-dimercaptocyclohexane, bis(2-mercaptoethyl)sulfide, 2,3-dimercapto-1-propanol, ethylene glycol bis(3-mercaptopropionate), diethylene glycol bis(3-mercaptopropionate), diethylene glycol bis(2-mercaptoglycolate), pentaerythritol tetrakis(2-mercaptothioglycolate), pentaerythritol tetrakis(3-mercaptopropionate), trimethylolpropane tris(2-mercaptothioglycolate), trimethylolpropane tris3-mercaptopropionate), 1,1,1-trimethylmercaptoethane, 1,1,1-trimethylmercaptopropane, 2,5-dimercaptomethylthiophane, 4-mercaptomethyl-1,8-dimercapto-3,6-dithiaoctane, 2,5-dimercaptomethyl-1,4-dithiane, 2,5-bis{(2-mercaptoethyl)thiomethyl}-1,4-dithiane, 1,3-cyclohexanedithiol, 1,4-cyclohexanedithiol, 4,8-dimercaptomethyl-1,11-mercapto-3,6,9-trithiaundecane, 4,7-dimercaptomethyl-1,11-mercapto-3,6,9-trithiaundecane, and 5,7-dimercaptomethyl-1,11-mercapto-3,6,9-trithiaundecane; and aromatic thiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, bis(4-mercaptophenyl)sulfide, bis(4-mercaptophenyl)sulfone, 2,2-bis(4-mercaptophenyl)propane, 1,2,3-trimercaptobenzene, 1,2,4-trimercaptobenzene, and 1,2,5-trimercaptobenzene. However, the thiols are not limited to those compounds mentioned above.

In addition, as particular examples of polythioepoxy compounds, which are represented by formula (5), obtained by thiation of polyepoxy compounds, for example, there may be mentioned acyclic aliphatic 2,3-epithiopropylthio compounds such as bis(2,3-epithiopropyl)sulfide, bis(2,3-epithiopropyl)disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 3,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[{2-(2,3-epithiopropylthio)ethyl}thiomethyl]-2-(2,3-epithiopropylthio)ethane, 1,1,2,2-tetrakis[{2-(2,3-epithiopropylthio)ethyl}thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane; and alicyclic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[{2-(2,3-epithiopropylthio)ethyl}thiomethyl]-1,4-dithiane, and 2,5-bis(2,3-epithiopropylthiomethyl)-2,5-dimethyl-1,4-dithiane; and aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis{4-(2,3-epithiopropylthio)phenyl}methane, 2,2-bis{4-(2,3-epithiopropylthio)phenyl}propane, bis{4-(2,3-epithiopropylthio)phenyl}sulfide, bis{4-(2,3-epithiopropylthio)phenyl}sulfone, and 4,4'-bis(2,3-epithiopropylthio)biphenyl. However, the polythioepoxy compounds are not limited to those compounds mentioned above. Among the compounds mentioned above, bis(2,3-epithiopropyl)sulfide and bis(2,3-epithiopropyl)disulfide are preferable compounds, and bis(2,3-epithiopropyl)sulfide is more preferable compound.

As a method for manufacturing a polymerizable composition comprising a compound which has at least one structure represented by formula (1), according to the present invention, in which the total of the thioepoxy compound A and the thioepoxy compound B is 4 mass percent or less with respect to the total mass of the polymerizable composition, among known methods for manufacturing a compound having at least one structure represented by formula (1) using a thiation agent and an acid or its anhydride, a method for limiting the amounts of a thiation agent and an acid or its anhydride is effective, and a method for limiting temperature conditions in addition to the amounts mentioned above is most effective.

For example, when a polythioepoxy compound having the structure represented by formula (9) is manufactured from a polyepoxy compound having the structure represented by formula (8), a method may be mentioned in which the amounts of a thiation agent and an acid or its anhydride for use are limited in consideration of epoxy equivalents of the polyepoxy compound and are then fed for reaction. In this case, although the amounts are not generally limited because of various structures and properties of epoxy compounds used as a starting material, a thiation agent in an amount of 0.9 to 1.3 equivalents may be used with respect to one epoxy equivalent of a polyepoxy compound having the structure represented by formula (8). In this case, an amount of 0.95 to 1.25 equivalents is preferably used. In addition, an amount of 0.975 to 1.21 equivalents is more preferable.

As for an acid or its anhydride, 0.2 equivalents or less may be used with respect to one epoxy equivalent of a polyepoxy compound having the structure represented by formula (8). In this case, an amount of 0.15 equivalents or less is preferable. In addition, an amount of 0.1 equivalents or less is more preferable.

The reaction temperature may be in the range of from 0 to 50° C., and preferably, in the range of from 5 to 45° C. A reaction temperature of 10 to 40° C. is more preferable.

In order to industrially control the reaction temperature as described above, one of a composition containing the polyepoxy compound and a composition containing a thiation agent is preferably allowed to drip to the other composition. In particular, it is more preferable that after the composition containing a thiation agent is placed still, the composition containing a polyepoxy compound be allowed to drip thereto. In this case, in the composition containing a polyepoxy compound, solvents, additives, water, and the like, which were used for synthesis thereof, may be contained, and from industrial point of view, the composition which still contains a solvent is preferably allowed to drip in terms of reaction efficiency, temperature control, and quality of an obtained thioepoxy compound.

As a reaction solvent used for thiation, a good result may be obtained frequently when a polar solvent alone or a mixture of a polar solvent and a nonpolar solvent is used. In particular, as polar solvents, for example, there may be mentioned alcohols such as water, methanol, and ethanol; ketones such as acetone, methyl ethyl ketone, and methyl isobutyl ketone; esters such as methyl acetate, ethyl acetate, propyl acetate, and butyl acetate; ethers such as tetrahydrofuran; aprotic polar solvents such as dimethylformamide, dimethylimidazolidinone, and dimethyl sulfoxide. However, the polar solvents are not limited to those mentioned above. As nonpolar solvents, for example, there may be mentioned aromatic hydrocarbons, such as benzene, toluene, and xylene, and halogen-substituted compound thereof; alicyclic hydrocarbons such as hexane and cyclohexane; and halogenated hydrocarbons such as dichloromethane, chloroform, and tetrachloromethane. However, the nonpolar solvents are not limited to those mentioned above.

As thiation agents used in this case, as is the case described above, for example, there may be mentioned thiocyanic acid salts, thioureas, and triphenylphosphine sulfide, and among those mentioned above, thiocyanic acid salts and thioureas are preferable. In consideration of reaction performance and cost, thiourea is more preferable.

In order to suppress the variation in refractive index and optical strain of a polymerizable composition manufactured by the method described above, a compound represented by formula (5) shown below may be mentioned as the thioepoxy compound A, the content of which is limited to a certain level.

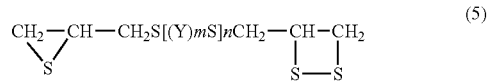

(Where Y, m, n are the same as those described above)

As particular examples of the thioepoxy compound A, there may be mentioned acyclic aliphatic (2,3-epithiopropyl)thio compounds having a (2,3-epidithiopropylthio group) structure represented by formula (2), such as 2,3-epidithiopropyl(2,3-epithiopropyl)sulfide, 2,3-epidithiopropyl(2,3-epithiopropyl)disulfide, 2,3-epidithiopropyl(2,3-epithiopropyl)thiomethane, 1-(2,3-epidithiopropylthio)-2-(2,3-epithiopropyl)thioethane, 1-(2,3-epidithiopropylthio)-2-(2,3-epithiopropyl)thiopropane, 1-(2,3-epidithiopropylthio)-3-(2,3-epithiopropyl)thiopropane, 1-(2,3-epidithiopropylthio)-3-(2,3-epithiopropyl)thio-2-methylpropane, 1-(2,3-epidithiopropylthio)-4-(2,3-epithiopropyl)thiobutane, 1-(2,3-epidithiopropylthio)-4-(2,3-epithiopropyl)thio-2-methylbutane, 1-(2,3-epidithiopropylthio)-3-(2,3-epithiopropyl)thiobutane, 1-(2,3-epidithiopropylthio)-5-(2,3-epithiopropyl)thiopentane, 1-(2,3-epidithiopropylthio)-5-(2,3-epithiopropyl)thio-2-methylpentane, 1-(2,3-epidithiopropylthio)-5-(2,3-epithiopropyl)thio-3-thiapentane, 1-(2,3-epidithiopropylthio)-6-(2,3-epithiopropyl)thiohexane, 1-(2,3-epidithiopropylthio)-6-(2,3-epithiopropyl)thio-2-methylhexane, and 1-(2,3-epidithiopropylthio)-8-(2,3-epithiopropyl)thio-3,6-dithiaoctane; and alicyclic (2,3-epithiopropyl)thio compounds having a (2,3-epidithiopropylthio group) structure represented by formula (2), such as 1-(2,3-epidithiopropylthio)-3-(2,3-epithiopropyl)thiocyclohexane, 1-(2,3-epidithiopropylthio)-4-(2,3-epithiopropyl)thiocyclohexane, 1-(2,3-epidithiopropylthiomethyl)-3-(2,3-epithiopropyl)thiomethylcyclohexane, 1-(2,3-epidithiopropylthiomethyl)-4-(2,3-epithiopropyl)thiomethylcyclohexane, 2-(2,3-epidithiopropylthiomethyl)-5-(2,3-epithiopropyl)thiomethyl-1,4-dithiane, 2-{(2-(2,3-epidithiopropylthioethyl)thio)ethyl}-5-{2-(2,3-epithiopropyl)thioethyl}thiomethyl-1,4-dithiane, and 2-(2,3-epidithiopropylthiomethyl)-5-(2,3-epithiopropyl)thiomethyl-2,5-dimethyl-1,4-dithiane; and aromatic (2,3-epithiopropyl)thio compounds having a (2,3-epidithiopropylthio group) structure represented by formula (2), such as 1-(2,3-epidithiopropylthio)-2-(2,3-epithiopropyl)thiobenzene, 1-(2,3-epidithiopropylthio-)3-(2,3-epithiopropyl)thiobenzene, 1-(2,3-epidithiopropylthio)-4-(2,3-epithiopropyl)thiobenzene, 1-(2,3-epidithiopropylthiomethyl)-2-(2,3-epithiopropyl)thiomethylbenzene, 1-(2,3-epidithiopropylthiomethyl)-3-(2,3-epithiopropyl)thiomethylbenzene, 1-(2,3-epidithiopropylthiomethyl)-4-(2,3-epithiopropyl)thiomethylbenzene, {4-(2,3-epithiopropylthio)phenyl-4'-(2,3-epidithiopropylthio)phenyl}methane, 2,2-{4-(2,3-epithiopropylthio)phenyl-4'-(2,3-epidithiopropylthio)phenyl}propane, {4-(2,3-epithiopropyl)thiophenyl-4'-(2,3-epidithiopropylthio)phenyl}sulfide, {4-(2,3-epithiopropylthio)phenyl-4'-(2,3-epidithiopropylthio)phenyl}sulfone, 4-(2,3-epithiopropylthio)-4'-(2,3-epidithiopropylthio)biphenyl, and 4-(2,3- epithiopropylthio)-4'-(2,3-epidithiopropylthio)phenyl sulfide. However, the thioepoxy compound A is not limited to the compounds mentioned above.

In addition, as the thioepoxy compound B, for example, a compound represented by formula (6) may be mentioned.

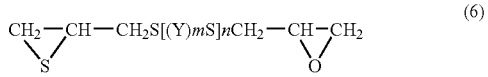

(6)

(Where Y, m, and n are the same as those described above)

As particular examples of the thioepoxy compound B, there may be mentioned acyclic aliphatic (2,3-epithiopropyl)thio compounds having a (2,3-epoxypropylthio group) structure represented by formula (4), such as 2,3-epoxypropyl(2,3-epithiopropyl)sulfide, 2,3-epoxypropyl(2,3-epithiopropyl)disulfide, 2,3-epoxypropylthio(2,3-epithiopropyl)thiomethane, 1-(2,3-epoxypropylthio)-2-(2,3-epithiopropyl)thioethane, 1-(2,3-epoxypropylthio)-2-(2,3-epithiopropyl)thiopropane, 1-(2,3-epoxypropylthio)-3-(2,3-epithiopropyl)thiopropane, 1-(2,3-epoxypropylthio)-3-(2,3-epithiopropyl)thio-2-methylpropane, 1-(2,3-epoxypropylthio)-4-(2,3-epithiopropyl)thiobutane, 1-(2,3-epoxypropylthio)-4-(2,3-epithiopropyl)thio-2-methylbutane, 1-(2,3-epoxypropylthio)-3-(2,3-epithiopropyl)thiobutane, 1-(2,3-epoxypropylthio)-5-(2,3-epithiopropyl)thiopentane, 1-(2,3-epoxypropylthio)-5-(2,3-epithiopropyl)thio-2-methylpentane, 1-(2,3-epoxypropylthio)-5-(2,3-epithiopropyl)thio-3-thiapentane, 1-(2,3-epoxypropylthio)-6-(2,3-epithiopropyl)thiohexane, 1-(2,3-epoxypropylthio)-6-(2,3-epithiopropyl)thio-2-methylhexane, and 1-(2,3-epoxypropylthio)-8-(2,3-epithiopropyl)thio-3,6-dithiaoctane; and alicyclic (2,3-epithiopropyl)thio compounds having a (2,3-epoxypropylthio group) structure represented by formula (4), such as 1-(2,3-epoxypropylthio)-3-(2,3-epithiopropyl)thiocyclohexane, 1-(2,3-epoxypropylthio)-4-(2,3-epithiopropyl)thiocyclohexane, 1-(2,3-epoxypropylthiomethyl)-3-(2,3-epithiopropyl)thiomethylcyclohexane, 1-(2,3-epoxypropylthiomethyl)-4-(2,3-epithiopropyl)thiomethylcyclohexane, 2-(2,3-epoxypropylthiomethyl)-5-(2,3-epithiopropyl)thiomethyl-1,4-dithiane, 2-{(2-(2,3-epoxypropylthioethyl)thio)ethyl}-5-{2-(2,3-epithiopropyl)thioethyl}thiomethyl-1,4-dithiane, and 2-(2,3-epoxypropylthiomethyl)-5-(2,3-epithiopropyl)thiomethyl-2,5-dimethyl-1,4-dithiane; and aromatic (2,3-epithiopropyl)thio compounds having a (2,3-epoxypropylthio group) structure represented by formula (4), such as 1-(2,3-epoxypropylthio)-2-(2,3-epithiopropyl)thiobenzene, 1-(2,3-epoxypropylthio-)3-(2,3-epithiopropyl)thiobenzene, 1-(2,3-epoxypropylthio)-4-(2,3-epithiopropyl)thiobenzene, 1-(2,3-epoxypropylthiomethyl)-2-(2,3-epithiopropyl)thiomethylbenzene, 1-(2,3-epoxypropylthiomethyl)-3-(2,3-epithiopropyl)thiomethylbenzene, 1-(2,3-epoxypropylthiomethyl)-4-(2,3-epithiopropyl)thiomethylbenzene, {4-(2,3-epithiopropylthio)phenyl-4'-(2,3-epoxypropylthio)phenyl}methane, 2,2-{4-(2,3-epithiopropyl)thiophenyl-4'-(2,3-epoxypropylthio)phenyl}propane, {4-(2,3-epithiopropylthio)phenyl-4'-(2,3-epoxypropylthio)phenyl}sulfide, {4-(2,3-epithiopropylthio)phenyl-4'-(2,3-epoxypropylthio)phenyl}sulfone, 4-(2,3-epithiopropylthio)-4'-(2,3-epoxypropylthio)biphenyl, and 4-(2,3-epithiopropylthio)-4'-(2,3-epoxypropylthio)phenyl sulfide. However, the thioepoxy compound B is not limited to the compounds mentioned above.

The polymerizable composition according to the present invention, which comprises a compound having at least one structure represented by formula (1), is a polymerizable composition in which the total of the thioepoxy compound A and the thioepoxy compound B is 4 mass percent or less with respect to the total mass of the polymerizable composition, and in this polymerizable composition, polysulfide oligomers such as dimmers, trimers, tetramers of the compound mentioned above; inorganic acids and organic acids added as a polymerization inhibitor; organic compounds such as a solvent and other by-products; and inorganic compounds may be contained as long as they may not cause any problems.

The polymerizable composition according to the present invention may be used for a resin having an intermediate refractive index in addition to a resin having a high refractive index, and in order to primarily control various properties of an obtained resin, such as impact resistance and specific gravity, and/or to control monomer viscosity and other handling properties, a resin modifier may be added for improvement of the resin.

As resin modifiers, in addition to the components added to the polymerizable composition of the present invention, for example, there may be mentioned thioepoxy compounds, thiol compounds, iso(thio)cyanates, mercapto organic acids, organic acids and anhydrides thereof, amino acids and mercaptoamines, amines, and olefins containing (meth)acrylates.

As particular examples of thiol compounds used as a resin modifier, for example, there may be mentioned aliphatic thiols such as methyl mercaptan, ethyl mercaptan, 1,1-methanedithiol, 1,2-ethanedithiol, 1,2-propanedithiol, 1,3-propanedithiol, 2,2-propanedithiol, 1,4-butanedithiol, 1,2,3-trimercaptopropane, tetrakis(mercaptomethyl)methane, 1,2-dimercaptocyclohexane, bis(2-mercaptoethyl)sulfide, 2,3-dimrcapto-1-propanol, ethylene glycol bis(3-mercaptopropionate), diethylene glycol bis(3-mercaptopropionate), diethylene glycol bis(2-mercaptoglycolate), pentaerythritol tetrakis(2-mercaptothioglycolate), pentaerythritol tetrakis(3-mercaptopropionate), trimethylolpropane tris(2-mercaptothioglycolate), trimethylolpropane tris3-mercaptopropionate), 1,1,1-trimethylmercaptoethane, 1,1,1-trimethylmercaptopropane, 2,5-dimercaptomethylthiophane, 4-mercaptomethyl-1,8-dimercapto-3,6-dithiaoctane, 2,5-dimercaptomethyl-1,4-dithiane, 2,5-bis{(2-mercaptoethyl)thiomethyl}-1,4-dithiane, 1,3-cyclohexanedithiol, 1,4-cyclohexanedithiol, 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane; and aromatic thiols such as benzylthiol, thiophenol, 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, bis(4-mercaptophenyl)sulfide, bis(4-mercaptophenyl)sulfone, 2,2-bis(4-mercaptophenyl)propane, 1,2,3-trimercaptobenzene, 1,2,4-trimercaptobenzene, and 1,2,5-trimercaptobenzene. However, the thiol compounds are not limited to the compounds mentioned above.

As particular examples of iso(thio)cyanate compounds used as a resin modifier, for example, there may be mentioned monofunctional isocyanates such as methyl isocyanate, ethyl isocyanate, n-propyl isocyanate, isopropyl isocyanate, n-butyl isocyanate, sec-butyl isocyanate, tert-butyl isocyanate, pentyl isocyanate, hexyl isocyanate, heptyl isocyanate, octyl isocyanate, decyl isocyanate, lauryl isocyanate, myristyl isocyanate, octadecyl isocyanate, 3-pentyl isocyanate, 2-ethylhexyl isocyanate, 2,3-dimethylcyclohexyl isocyanate, 2-methoxyphenyl isocyanate, 4-methoxyphenyl isocyanate, α-methylbenzyl isocyanate, phenylethyl isocyanate, phenyl isocyanate, o-, m-, or p-tolyl isocyanate, cyclohexyl isocyanate, benzyl isocyanate, and (isocyanatomethyl)bicycloheptane;

aliphatic polyisocyanate compound such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl)carbonate, bis(isocyanatoethyl)ether, lysine diisocyanatomethyl ester, lysine triisocyanate, xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, mesitylylene triisocyanate, and 2,6-di(isocyanatomethyl)furan;

alicyclic polyisocyanate compounds such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2-dimethyldicyclohexylmethane diisocyanate, 2,5-bis(isocyanatomethyl)bicyclo-[2,2,1]-heptane, 2,6-bis(isocyanatomethyl)bicyclo-[2,2,1]-heptane, 3,8-bis(isocyanatomethyl)tricyclodecane, 3,9-bis(isocyanatomethyl) tricyclodecane, 4,8-bis(isocyanatomethyl)tricyclodecane, and 4,9-bis(isocyanatomethyl)tricyclodecane;

aromatic polyisocyanate compounds such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, phenylisocyanatoethyl isocyanate, hexahydrobenene diisocyanate, and hexahydrodiphenylmethane-4,4-diisocyanate;

sulfur-containing aliphatic polyisocyanate compounds such as bis(isocyanatomethyl)sulfide, bis (isocyanatoethyl) sulfide, bis (isocyanatopropyl) sulfide, bis(isocyanatehexyl) sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio) methane, bis (isocyanatoethylthio)methane, bis(isocyanatoethylthio)ethane, bis(isocyanatomethylthio)ethane, and 1,5-diisocyanato-2-isocyanatomethyl-3-thiapentane;

aromatic sulfide-type polyisocyanate compounds such as diphenylsulfide-2,4-diisocyanate, diphenylsulfide-4,4-diisocyanate, 3,3-dimethoxy-4,4-diisocyanatodibenzyl thioether, bis(4-isocyanatomethylbenzene)-sulfide, and 4,4-methoxybenzene-thioethyleneglycol-3,3-diisocyanate;

aromatic disulfide-type polyisocyanates such as diphenyldisulfide-4,4-diisocyanate, 2,2-dimethyldiphenyldisulfide-5,5-diisocyanate, 3,3-dimethyldiphenyldisulfide-5,5-diisocyanate, 3,3-dimethyldiphenyldisulfide-6,6-diisocyanate, 4,4-dimethyldiphenyldisulfide-5,5-diisocyanate, 3,3-dimethoxydiphenyldisulfide-4,4-diisocyanate, and 4,4-dimethoxydiphenyldisulfide-3,3-diisocyanate;

sulfur-containing heterocyclic compounds such as 2,5-diisocyanatothiophene and 2,5-bis(isocyanatomethyl) thiophene; and others such as 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane. However, the iso(thio)cyanate compounds are not limited to the compounds mentioned above. In addition, as usable materials based on the compounds mentioned above, for example, there may be mentioned halogen-substituted compounds such as chlorine-substituted or bromine-substituted compounds, alkyl-substituted compounds, alkoxy-substituted compounds, nitro-substituted compounds, prepolymer-type modified compounds formed with polyols, carbodiimide modified compounds, urea modified compounds, biuret-modified compounds, and products obtained by dimerization and trimerization reactions.

Furthermore, as particular examples of isothiocyanate compounds, for example, there may be mentioned monofunctional isothiocyanate compounds such as methyl isothiocyanate, ethyl isothiocyanate, n-propyl thioisocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m- or p-tolyl isothiocyanate, cyclohexyl isothiocyanate, benzyl isothiocyanate, and (isothiocyanatomethyl)bicycloheptane;

aliphatic polyisothiocyanate compounds such as 1,6-diisothiocyanatohexane and p-phenyleneisopropylidene diisothiocyanate; alicyclic polyisothiocyanate compounds such as cyclohexane diisothiocyanate and (diisothiocyanato) methylbicycloheptane;

aromatic isothiocyanate compounds such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4-diisothiocyanato-1,1-biphenyl, 1,1-methylene-bis(4-isothiocyanatobenzene), 1,1-methylene-bis(4-isothiocyanato-2-methylbenzene), 1,1-methylene-bis(4-isothiocyanato-3-methylbenzene), 1,1-(1,2-ethanediyl)bis(isothiocyanatobenzene), 4,4-diisothiocyanatobenzophenone, 4,4-diisothiocyanato-3,3-dimethylbenzophenone, diphenyl ether-4,4-diisothiocyanate, and diphenylamine-4,4-diisothiocyanate; and furthermore, carbonylisothiocyanate compounds such as 1,3-benzenedicarbonyl diisothiocyanate, 1,4-benzenedicarbonyl diisothiocyanate, and (2,2-pyridine)-4,4-dicarbonyl diisothiocyanate. However, the isothiocyanate compounds are not limited to the compounds mentioned above.

As particular examples of isothiocyanate compounds containing at least one sulfur atom in addition to an isothiocyanate group, for example, there may be mentioned sulfur-containing aliphatic isothiocyanate compounds such as thiobis(3-isothiocyanatopropane), thiobis(2-isothiocyanatoethane), and dithiobis(2-isothiocyanatoethane); sulfur-containing aromatic isothiocyanate compounds such as 1-isothiocyanato-4-[(2-isothiocyanato)sulfonyl]benzene, thiobis(4-isothiocyanatobenzene), sulfonylbis(4-isothiocyanatobenzene), and dithiobis(4-isothiocyanatobenzene); and sulfur-containing heterocyclic isothiocyanate compounds such as 2,5-diisothiocyanatothiophene and 2,5-diisothiocyanato-1,4-dithiane. However, the isothiocyanate compounds containing at least one sulfur atom, mentioned above, are not limited to those mentioned above.

In addition, as usable materials based on the compounds mentioned above, for example, there may be mentioned halogen-substituted compounds such as chlorine-substituted or bromine-substituted compounds, alkyl-substituted compounds, alkoxy-substituted compounds, nitro-substituted compounds, prepolymer-type modified compounds formed with polyols, carbodiimide modified compounds, urea modified compounds, biuret-modified compounds, and products obtained by dimerization and trimerization reactions.

Furthermore, isothiocyanate compounds having an isocyanate group may also be mentioned. For example, there may be mentioned aliphatic and alicyclic compounds such as 1-isocyanato-6-isothiocyanatohexane and 1-isocyanato-4-isothiocyanatocyclohexane; aromatic compounds such as 1-isocyanato-4-isothiocyanatobenzene and 4-methyl-3-isocyanato-1-isothiocyanatobenzene; and heterocyclic compounds such as 2-isocyanato-4,6-diisothiocyanato-1,3,5-triazine; and sulfur-containing compounds in addition to an isothiocyanate group, such as 4-isocyanato-4'-isothiocyanatodiphenyl sulfide and 2-isocyanato-2'-isothiocyanatodiethyl disulfide. However, the isothiocyanate compounds having an isocyanate group are not limited to those compounds mentioned above.

In addition, for example, as usable materials based on the compounds mentioned above, there may be mentioned halogen-substituted compounds such as chlorine-substituted or bromine-substituted compounds, alkyl-substituted compounds, alkoxy-substituted compounds, nitro-substituted compounds, prepolymer-type modified compounds formed with polyols, carbodiimide modified compounds, urea modified compounds, biuret-modified compounds, and products obtained by dimerization and trimerization reactions.

As particular examples of mercapto organic acids, for example, there may be mentioned thioglycolic acid, 3-mercaptopropionic acid, thioacetic acid, thiolactic acid, thiomalic acid, and thiosalicylic acid, and as particular examples of organic acids and anhydrides thereof, for example, there may be mentioned, in addition to the polymerization inhibitors mentioned above, thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornenic anhydride, methylnorbornanic anhydride, maleic anhydride, trimellitic anhydride, and pyromellitic anhydride. However, the mercapto organic acids and the organic acids and the anhydrides thereof are not limited to those compounds mentioned above.

As particular examples of amine compounds, for example, there may be mentioned monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethyl-hexylamine, 1,2-dimethylhexylamine, allylamine, aminomethylbicycloheptane, cyclopentylamine, cyclohexylamine, 2,3-dimethylcyclohexylamine, aminomethylcyclohexane, aniline, benzylamine, phenetylamine, 2-, 3-, or 4-methylbenzylamine, o-, m-, or p-methylaniline, o-, m-, or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, and 2,2-diethoxyethylamine;

primary polyamine compounds such as ethylenediamine, 1,2- or 1,3-diaminopropane, 1,2-, 1,3- or 1,4-diaminobutane, 1,5-diaminopentane, 1,6-diaminohexane, 1,7-diaminoheptane, 1,8-diaminooctane, 1,10-diaminodecane, 1,2-, 1,3- or 1,4-diaminocyclohexane, o-, m- or p-diaminobenzene, 3,4- or 4,4'-diaminobenzophenone, 3,4- or 4,4'-diaminodiphenylether, 4,4'-diaminodiphenylmethane, 4,4'-diaminodiphenylsulfide, 3,3'- or 4,4'-diaminodiphenylsulfone, 2,7-diaminofluorene, 1,5-, 1,8- or 2,3-diaminonaphthalene, 2,3-, 2,6- or 3,4-diaminopyridine, 2,4- or 2,6-diaminotoluene, m-, or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine; and monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di(4-piperidyl)methane, 1,2-di(4-piperidyl)ethane, 1,3-di(4-piperidyl)propane, 1,4-di(4-piperidyl)butane, and tetramethylguanidine. However, the amine compounds are not limited to those mentioned above.

As particular examples of olefins, for example, there may be mentioned (meth)acrylate compounds such as benzyl acrylate, benzyl methacrylate, butyxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, 3-phenoxy-2-hydroxypropyl acrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol-A diacrylate, bisphenol-A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol-F diacrylate, bisphenol-F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylenedithiol diacrylate, xylenedithiol dimethacrylate, mercaptoethylsulfide diacrylate, and mercaptoethylsulfide dimethacrylate; allyl compounds such as allyl glycidyl ether, diallyl phthalate, diallyl terephthalate, diallyl isophthalate, diallyl carbonate, and diethylene glycol bisallyl carbonate; vinyl compounds such as styrene, chlorostyrene, methylstyrene, bromostyrene, dibromostyrene, divinylbenzene, and 3,9-divinyl-spiro-bi(m-dioxane); and diisopropenylbenzene. However, the olefin compounds are not limited to those mentioned above.

The resin modifiers mentioned above may be used alone or in combination.

As curing catalysts used in this invention, for example, tertiary amines, phosphines, quaternary ammonium salts, quaternary phosphonium salts, Lewis acids, radical polymerization catalysts, and cationic polymerization catalysts are generally used.

As particular examples of curing catalysts, for example, there may be mentioned tertiary amines such as triethylamine, tri-n-butylamine, tri-n-hexylamine, N,N-diisopropylethylamine, triethylenediamine, triphenylamine, N,N-dimethylethanolamine, N,N-diethylethanolamine, N,N-dibutylethanolamine, N,N-dimethylbenzylamine, diethylbenzylamine, N,N-dimethylcyclohexylamine, N,N-diethylcyclohexylamine, N-methyldicyclohexylamine, N-methylmorpholine, N-isopropylmorpholine, pyridine, N,N-dimethylaniline, β-picoline, N,N'-dimethylpiperazine, N-methylpiperizine, 2,2'-bipyridyl, hexamethylenetetramine, and 1,8-diazabicyclo(5.4.0)-7-undecene; phosphines such as trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane, and 1,2-bis(dimethylphosphino)ethane; quaternary ammonium salts such as tetramethylammonium bromide, tetrabutylammonium chloride, and tetrabutylammonium bromide; quaternary phosphonium salts such as tetramethylphosphonium bromide, tetrabutylphosphonium chloride, and tetrabutylphosphonium bromide; Lewis acids such as dimethyltin dichloride, dibutyltin dichloride, dibutyltin dilaurate, tetrachlorotin, dibutyltin oxide, diacetoxytetrabutyl distannoxane, zinc chloride, zinc acetylacetonate, aluminum chloride, aluminum fluoride, triphenylaluminum, titanium tetrachloride, and calcium acetate; radical polymerization catalysts such as 2,2'-azobis(2-cyclopropylpropionitrile), 2,2'-azobis(4-methoxy-2,4-dimethylvaleronitrile), 2,2'-azobis(2,4-dimethylvaleronitrile), t-butylperoxy-2-ethyl hexanoate, n-butyl-4,4'-bis(t-butylperoxy)valerate, and t-butyl peroxybenzoate; and cationic polymerization catalysts such as diphenyliodonium hexafluorophosphate, diphenyliodonium hexafluoroarsenate, diphenyliodonium hexafluoroantimony, triphenylsulfonium tetrafluoroborate, triphenylsulfonium hexafluorophosphate, and triphenylsulfonium hexafluoroarsenate. However, the curing catalysts are not limited to those mentioned above. Preferable compounds among those mentioned above are tertiary amine compounds, phosphine compounds, quaternary ammonium salts, and quaternary phosphonium salts.

The curing catalysts mentioned above may be used alone or in combination.

When an amount of the curing catalyst of 0.001 to 1 mass percent is used with respect to the total mass of a polymerizable composition containing a thioepoxy compound, preferable pot life and properties of an obtained resin, such as transparence, optical properties, and weatherability may be obtained. In addition, an amount of 0.01 to 5 mass percent is more preferably used.

As a typical polymerization method for obtaining a resin (plastic lens or the like) of the present invention, for example, cast polymerization may be mentioned. That is, a polymerizable composition containing a thioepoxy compound and a curing catalyst is poured between mold plates held by a gasket or a tape. In this step, defoaming or the like may be performed whenever necessary and it may not cause any problems at all.

Next, heating is performed in a heating device, that is, in an oven or in water, for curing, and the resin can then be demolded.

Since the type and the amount of catalyst or the like and the type and ratio of monomers, which are used for obtaining the resin of the present invention, vary in accordance with each own polymerizable composition, they cannot be generally determined.

Since heating conditions for polymerizing the polymerizable composition of the present invention poured into a cast mold largely depend on the type of thioepoxy compound, the type of curing catalyst, the shape of the mold, and the like, they cannot be generally determined; however, heating is performed at approximately −50 to 200° C. for 1 to 100 hours.

Preferable results may be obtained in some cases when the temperature is held or is gradually increased in the range of from 10° C. to 150° C. for 1 to 80 hours for polymerization.

In addition, when the polymerizable composition of the present invention is irradiated with energy rays such as ultraviolet rays or electron beams, the polymerization time can be decreased. In the case described above, a curing catalyst such as a radical polymerization catalyst or a cationic polymerization catalyst may be required in some cases.

When a resin of the present invention is molded, in accordance with individual purposes, as is the case of known molding methods, various materials such as chain extenders, cross-linking agents, photostabilizers, UV absorbers, antioxidants, anti-coloring agents, dyes, fillers, external and internal mold release agents, and adhesion improvers may be added.

In addition, a demolded resin may be processed by annealing or the like whenever necessary.

A resin obtained by curing the polymerizable composition of the present invention is a very superior transparent resin in which variations in hue and refractive index are not observed and the optical strain does not exist. Various forms of the resin described above can be obtained as a molded substance by changing a mold used for cast molding, and the molded substance can be used as a transparent resin for various applications, such as a material for optical elements, which require stable refractive indices, including glass lenses, camera lenses, and light-emitting diodes (LED). In particular, they can be preferably used as an optical material for glass lenses, camera lenses, and the like.

Furthermore, for example, in order to improve antireflection, anti-abrasion, or chemical resistance, or in order to impart high hardness, antifoggy properties, and cosmetic properties, lenses obtained from the resin of the present invention can be processed by physical or chemical treatment such as surface polishing, antistatic treatment, hard coating, non-reflection coating, or dyeing.

EXAMPLES

Hereinafter, the present invention will be described in more detail with reference to examples. Among performance evaluations of the resin obtained in the examples, the refractive index and the optical strain were evaluated by the following methods.

Refractive Index (ne): Measurement was performed at a temperature of 20° C. using a Pulfrich refractometer.

Hue: When a YI value of a resin, measured by a calorimeter, was different by ±1 or more from a value (described in Examples 1 and 4) obtained by curing a specific polymerizable composition, the resin was regarded as x (not good), and when the YI value is less than that, the resin is regarded as o (good). The specific polymerizable composition mentioned above was a polymerizable composition containing a compound which has at least one structure represented by formula (1), in which the total content of a thioepoxy compound, which has at least one intramolecular structure represented by formula (2) and at least one intramolecular structure represented by formula (3), and a thioepoxy compound, which has at least one intramolecular structure represented by formula (4) and at least one intramolecular structure represented by formula (3), was 0 with respect to the total amount of the polymerizable composition.

Optical strain: Observation was performed by visual inspection using a high pressure mercury lamp. A resin having an optical strain was represented by x (not good), and a resin having no strain was represented by o (good).

In the examples, as a thioepoxy compound having at least one structure represented by formula (1), bis(2,3-epithiopropyl)disulfide (called a compound (a)) and bis(2,3-epithiopropyl)sulfide (called a compound (b)) were used; as by-produced impurities, that is, as the thioepoxy compound having at least one intramolecular structure represented by formula (2) and at least one intramolecular structure represented by formula (3), 2,3-epidithiopropyl(2,3-epithiopropyl)disulfide (called a compound (c)) and 2,3-epidithiopropyl(2,3-epithiopropyl)sulfide (called a compound (d)) were used; and as the thioepoxy compound having at least one intramolecular structure represented by formula (4) and at least one intramolecular structure represented by formula (3), 2,3-epoxypropyl(2,3-epithiopropyl)disulfide (called a compound (e)) and 2,3-epoxypropyl(2,3-epithiopropyl)sulfide (called a compound (f)) were used. Impurity analysis of the compounds mentioned above and polymerization of a polymerizable composition formed of the composition described above were performed, and the evaluations were then carried out. In addition, after the compound (c), the compound (d), the compound (e), and the compound (f) were synthesized and isolated as described below, the structures were determined beforehand, and analytical factors thereof were also determined.

Synthesis Example 1

Synthesis of Compound (c)

After 1,000 ml of methanol and 3.5 g of calcium hydroxide were charged in a reactor provided with a stirrer and a thermometer, 450 g of a hydrogen sulfide gas was introduced thereinto for 6 hours while 555 g of epichlorohydrine was added dropwise. In this step, the solution in the reactor was always maintained at a temperature of 0° C. to 5° C. After the reaction was finished, the hydrogen sulfide gas was removed, and the methanol was then removed by distillation, 760 g of crude 1-chloro-3-mercapto-2-propanol was obtained. The compound thus obtained was processed by simple distillation, thereby obtaining a compound having a purity of 99%. Next, particles of solid iodine were added stepwise to a mixture of 250 g of this distilled material, water, methanol, and 180 g of sodium bicarbonate. Next, after toluene and 350 g of a sodium hydroxide solution at a concentration of 25% were added, the mixture thus formed was held for 3 hours for aging. After an organic layer obtained through the aging was washed with water twice, 130 g of thiourea, 5 g of acetic acid, and methanol were added thereto, and the mixture thus formed was stirred for 16 hours at a temperature of 25° C. After aging, a toluene layer was washed with an aqueous solution containing sodium chloride, thereby obtaining a toluene layer containing the compound (a). Next, 130 g of thiourea, 5 g of acetic acid, and methanol were mixed with this toluene layer thus obtained and were then stirred for 6 hours at a temperature of 25° C. After aging, the toluene layer thus obtained was washed with an aqueous solution containing sodium chloride, thereby obtaining a toluene layer containing the compound (c). After the toluene layer was condensed, purification was performed with a silica-gel column using chloroform and hexane as a developing solvent. After the purification, 32 g of the compound (c) was obtained.

The analytical data of the compound (c) thus obtained is shown below.

| ELEMENTAL ANALYSIS DATA | C | H | S |
|---|---|---|---|
| THEORETICAL VALUE (%) | 29.7 | 4.2 | 66.1 |
| ANALYTICAL VALUE (%) | 30.3 | 3.9 | 65.8 |
| MS SPECTRUM | | | |

M$^+$= 242
IR SPECTRUM 614 cm$^{-1}$; EPISULFIDE
$^{13}$C-NMR SPECTRUM

1; 25.9 ppm 2; 33.3 ppm 3; 43.5 ppm
4; 43.7 ppm 5; 45.7 ppm 6; 55.5 ppm

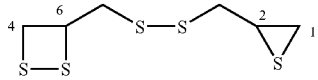

Synthesis Example 2

Synthesis of Compound (d)

After 250 g of 1-chloro-3-mercapto-2-propanol and 2.5 g of calcium hydroxide were mixed together in a reactor provided with a stirrer and a thermometer, 190 g of epichlorohydrine was added dropwise to the solution thus obtained which was maintained at a temperature of 40° C. Next, toluene and 350 g of a sodium hydroxide solution at a concentration of 25% were added to the mixture thus obtained and were then held for 3 hours for aging. After an organic layer obtained through the aging was washed with water twice, 120 g of thiourea, 5 g of acetic acid, and methanol were added thereto, and a mixture thus formed was stirred for 10 hours at a temperature of 25° C. After aging, a toluene layer was washed with an aqueous solution containing sodium chloride, thereby obtaining a toluene layer containing the compound (b). Next, 120 g of thiourea, 5 g of acetic acid, and methanol were mixed with this toluene layer thus obtained and were then stirred for 6 hours at a temperature of 25° C. After aging, the toluene layer thus obtained was washed with an aqueous solution containing sodium chloride, thereby obtaining a toluene layer containing the compound (d). After the toluene layer was condensed, purification was performed with a silica-gel column using chloroform and hexane as a developing solvent. After the purification, 28 g of the compound (d) was obtained.

The analytical data of the compound (d) thus obtained is shown below.

| ELEMENTAL ANALYSIS DATA | C | H | S |
|---|---|---|---|
| THEORETICAL VALUE (%) | 34.2 | 4.8 | 61.0 |
| ANALYTICAL VALUE (%) | 34.3 | 5.1 | 60.6 |
| MS SPECTRUM | | | |

$M^+ = 210$
IR SPECTRUM 614 cm$^{-1}$; EPISULFIDE
$^{13}$C-NMR SPECTRUM

1; 25.5 ppm 2; 33.3 ppm 3; 33.6 ppm
4; 36.3 ppm 5; 43.4 ppm 6; 53.2 ppm

Synthesis Example 3

Synthesis of Compound (e)

After 1,000 ml of methanol and 3.5 g of calcium hydroxide were charged in a reactor provided with a stirrer and a thermometer, 450 g of a hydrogen sulfide gas was introduced thereinto for 6 hours while 555 g of epichlorohydrine was added dropwise. In this step, the solution in the reactor was always maintained at a temperature of 0° C. to 5° C. After the reaction was finished, the hydrogen sulfide gas was removed, and the methanol was then removed by distillation, thereby obtaining 760 g of crude 1-chloro-3-mercapto-2-propanol. The compound thus obtained was processed by simple distillation, thereby obtaining a compound having a purity of 99%. Next, particles of solid iodine were added stepwise to a mixture of 250 g of this distillated material, water, methanol, and 180 g of sodium bicarbonate. Next, after toluene and 350 g of a sodium hydroxide solution at a concentration of 25% were added, the mixture thus formed was held for 3 hours for aging. After an organic layer obtained through the aging was washed with water twice, 70 g of thiourea, 5 g of acetic acid, and methanol were added thereto, and the mixture thus formed was stirred for 8 hours at a temperature of 25° C. After aging, a toluene layer was washed with an aqueous solution containing sodium chloride, thereby obtaining a toluene layer containing the compound (e). After the toluene layer was condensed, purification was performed with a silica-gel column using chloroform and hexane as a developing solvent. After the purification, 25 g of the compound (e) was obtained.

The analytical data of the compound (e) thus obtained is shown below.

| ELEMENTAL ANALYSIS DATA | C | H | O | S |
|---|---|---|---|---|
| THEORETICAL VALUE (%) | 37.1 | 5.2 | 8.2 | 49.5 |
| ANALYTICAL VALUE (%) | 37.8 | 4.8 | 7.5 | 49.9 |
| MS SPECTRUM | | | | |

$M^+ = 194$
IR SPECTRUM 614 cm$^{-1}$; EPISULFIDE
840, 3055 cm$^{-1}$; EPOXIDE
$^{13}$C-NMR SPECTRUM

1; 26.2 ppm 2; 34.6 ppm 3; 41.5 ppm
4; 45.7 ppm 5; 47.2 ppm 6; 53.2 ppm

Synthesis Example 4

Synthesis of Compound (f)

After 250 g of 3-chloro-1-mercapto-2-propanol and 2.5 g of calcium hydroxide were mixed together in a reactor provided with a stirrer and a thermometer, 190 g of epichlorohydrine was added dropwise to the solution thus obtained which was maintained at a temperature of 40° C. Next, toluene and 350 g of a sodium hydroxide solution at a concentration of 25% were added to the mixture thus obtained and were then held for 3 hours for aging. After an organic layer obtained through the aging was washed with water twice, 70 g of thiourea, 5 g of acetic acid, and methanol were added thereto, and the mixture thus formed was stirred for 6 hours at a temperature of 25° C. After aging, a toluene layer was washed with an aqueous solution containing sodium chloride, thereby obtaining a toluene layer containing the compound (f). After the toluene layer was condensed, purification was performed with a silica-gel column using chloroform and hexane as a developing solvent. After the purification, 24 g of the compound (f) was obtained.

The analytical data of the compound (f) thus obtained is shown below.

| ELEMENTAL ANALYSIS DATA | C | H | O | S |
|---|---|---|---|---|
| THEORETICAL VALUE (%) | 44.4 | 6.2 | 9.9 | 39.5 |
| ANALYTICAL VALUE (%) | 44.8 | 5.9 | 10.2 | 39.1 |
| MS SPECTRUM | | | | |

$M^+ = 162$
IR SPECTRUM 615 cm$^{-1}$; EPISULFIDE
840, 3052 cm$^-$1; EPOXIDE

-continued

| ELEMENTAL ANALYSIS DATA | C | H | O | S |
|---|---|---|---|---|

¹³C-NMR SPECTRUM

1; 25.5 ppm 2; 33.6 ppm 3; 34.3 ppm
4; 46.3 ppm 5; 38.4 ppm 6; 52.6 ppm

Thiourea in an amount of 152 g (1.05 equivalents) used as a thiation agent was allowed to react with epoxy groups of 178 g (purity of 95%) of bis(2,3-epoxypropyl)disulfide in a solvent of 200 g of toluene and 100 g of methanol at 15° C. using 2.5 g (0.022 equivalents) of acetic acid as a catalyst. After the reaction was completed, an organic layer was washed three times by adding an aqueous solution containing sodium chloride and was then recovered, followed by condensation. The residue thus obtained was dissolved in cyclohexane, and the supernatant thereof was passed through a silica gel column for condensation. The resultant residue thus obtained was a polymerizable composition in which the compound (a) was contained, and the total of the compound (c) and the compound (e) was 0.8 mass percent. After this polymerizable compound was passed through a silica gel column for chromatographic purification using chloroform and hexane as a developing solvent, the total of the compound (c) and the compound (e) in the resultant polymerizable composition was 0 mass percent. To 100 g of this resultant composition obtained by the chromatographic purification, 0.1 g of N,N-dimethylcyclohexylamine was added as a curing catalyst, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having a YI of 5.4 and no optical strain.

Example 2

Synthesis was performed in a manner equivalent to that in Example 1, in which thiourea in an amount of 1.05 equivalents was used as a thiation agent with respect to one epoxy group of bis(2,3-epoxypropyl)disulfide. In the resultant polymerizable composition, the compound (a) was contained, and in addition, the total of the compound (c) and the compound (e) was 0.8 mass percent. Without performing chromatographic purification, 0.1 g of N,N-dimethylcyclohexylamine was added as a curing catalyst to 100 g of this resultant composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 3

Operation similar to that in Example 2 was performed 10 times for yield evaluation. The total of the compound (c) and the compound (e) in each of the resultant polymerizable compositions was stable and was 1 mass percent or less. The refractive indexes and the hues of the resins obtained by polymerization were the same as those obtained in Example 1, the optical strain was also not observed, and hence the resultant resins were superior.

Example 4

In a manner equivalent to that in Example 0.1, reaction was performed except that thiourea in an amount of 1.15 equivalents was used with respect to one epoxy group, and a polymerizable composition was obtained. In the resultant polymerizable composition, the compound (a) was contained, and in addition, the total of the compound (c) and the compound (e) was 0.7 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 5

Operation similar to that in Example 4 was performed 10 times for yield evaluation. The total of the compound (c) and the compound (e) in each of the resultant polymerizable compositions was stable and was 1 mass percent or less. The refractive indexes and the hues of the resins obtained by polymerization were the same as those obtained in Example 1, the optical strain was also not observed, and hence the resultant resins were superior.

Example 6

As an epoxy compound, bis(2,3-epoxypropyl)sulfide was used, and in a manner equivalent to that in Example 1, reaction and purification using a column chromatographic method were performed. The total of the compound (d) and the compound (f) in the resultant polymerizable composition obtained after purification was 0 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having a YI of 4.2 and no optical strain.

Example 7

In a manner equivalent to that in Example 6, reaction was performed except that a thiation agent in an amount of 1.15 equivalents was used with respect to one epoxy group and that the reaction temperature was set to 25° C. In the resultant polymerizable composition thus obtained, the compound (b) was contained, and in addition, the total of the compound (d) and the compound (f) was 0.9 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 8

Operation similar to that in Example 7 was performed 10 times for yield evaluation. The total of the compound (d) and the compound (f) in each of the resultant polymerizable compositions was stable and was 1.5 mass percent or less. The refractive indexes and the hues of the resins obtained by polymerization were the same as those obtained in Example 6, the optical strain was also not observed, and hence the resultant resins were superior.

Example 9

In a manner equivalent to that in Example 6, reaction was performed except that a thiation agent in an amount of 1.20 equivalents was used with respect to one epoxy group. In the resultant polymerizable composition, the compound (b) was contained, and in addition the total of the compound (d) and the compound (f) was 1.2 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 10

Operation similar to that in Example 9 was performed 10 times for yield evaluation. The total of the compound (d) and the compound (f) in each of the resultant polymerizable compositions was stable and was 1.5 mass percent or less. The refractive indexes and the hues of the resins obtained by polymerization were the same as those obtained in Example 6, the optical strain was also not observed, and hence the resultant resins were superior.

Example 11

In a manner equivalent to that in Example 4, reaction was performed except that a thiation agent in an amount of 1.28 equivalents was used with respect to one epoxy group and that the reaction temperature was set to 35° C. In the resultant polymerizable composition, the compound (b) was contained, and in addition, the total content of the compound (d) and the compound (f) was 1.4 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 12

Operation similar to that in Example 11 was performed 10 times for yield evaluation. The total of the compound (d) and the compound (f) in each of the resultant polymerizable compositions was stable and was 1.5 mass percent or less. The refractive indexes and the hues of the resins obtained by polymerization were the same as those obtained in Example 6, the optical strain was also not observed, and hence the resultant resins were superior.

Example 13

In a manner equivalent to that in Example 6, reaction was performed except that a thiation agent in an amount of 1.28 equivalents was used with respect to one epoxy group, that the reaction temperature was set to 35° C., and that a composition containing a polyepoxy compound was added dropwise to a composition containing the thiation agent. In the resultant polymerizable composition, the compound (b) was contained, and the total content of the compound (d) and the compound (f) was 1.2 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin was superior having no optical strain.

Example 14

Operation similar to that in Example 13 was performed 10 times for yield evaluation. The total of the compound (d) and the compound (f) in each of the resultant polymerizable compositions was stable and was 1.5 mass percent or less. The refractive indexes and the hues of the resins obtained by polymerization were the same as those obtained in Example 6, the optical strain was also not observed, and hence the resultant resins were superior.

Comparative Example 1

In a manner equivalent to that in Example 1, reaction was performed except that a thiation agent in an amount of 3.5 equivalents was used with respect to one epoxy group. In the resultant polymerizable composition, the compound (a) was contained, and in addition, the total of the compound (c) and the compound (e) was 4.2 mass percent. This polymerizable composition had a strong yellow hue which could be easily observed by visual inspection. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin had a high YI value and also had optical strain, and the refractive index thereof was different from that in Example 1.

Comparative Example 2

Operation similar to that in Comparative Example 2 was performed 10 times for yield evaluation. The total of the compound (c) and the compound (e) in each of the resultant polymerizable compositions was 4 mass percent or more. As for the refractive indexes and the hues of the resins obtained by polymerization, the YI value was high and the refractive index was different as compared to those in Example 1. Furthermore, eight resins out of the 10 resins had optical strain, and hence decrease in yield was also confirmed.

Comparative Example 3

In a manner equivalent to that in Example 6, reaction was performed except that a thiation agent in an amount of 0.8 equivalents was used with respect to one epoxy group. In the resultant polymerizable composition, the compound (b) was contained, and in addition, the total content of the compound (d) and the compound (f) was 5.6 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin had a high YI value and also had optical strain, and the refractive index thereof was different from that in Example 6.

Comparative Example 4

Operation similar to that in Comparative Example 3 was performed 10 times for yield evaluation. The total of the compound (d) and the compound (f) in each of the resultant polymerizable compositions was 4 mass percent or more. As for the refractive indexes and the hues of the resins obtained by polymerization, the YI value was high and the refractive index was different as compared to those in Example 1. Furthermore, all ten resins thus formed had optical strain, and hence decrease in yield was also confirmed.

Comparative Example 5

In a manner equivalent to that in Example 4, reaction was performed except that a thiation agent in an amount of 3.5 equivalents was used with respect to one epoxy group, and that the reaction temperature was set to 60° C. In the resultant polymerizable composition, the compound (b) was contained, and in addition, the total content of the compound (d) and the compound (f) was 5.2 mass percent. Next, 0.1 g of N,N-dimethylcyclohexylamine was added as a curing catalyst to 100 g of this polymerizable composition, followed by stirring, and after defoamed under vacuum for 0.1 hours, the resultant composition was cast in a molding tool formed of a glass mold and a gasket. This mold was gradually heated from 30° C. to 120° C., and polymerization was performed for 24 hours. After this polymerization, the mold was gradually cooled, and the resin was then recovered from the mold. The properties of the resultant resin are shown in Table-1. The resultant resin had a high YI value and also had optical strain, and the refractive index thereof was different from that in Example 4.

Comparative Example 6

Operation similar to that in Comparative Example 5 was performed 10 times for yield evaluation. The total of the compound (d) and the compound (f) in each of the resultant polymerizable compositions was 4 mass percent or more. As for the refractive indexes and the hues of the resins obtained by polymerization, the YI value was high and the refractive index was different as compared to those in Example 6. Furthermore, eight resins out of the 10 resins had optical strain, and hence decrease in yield was also confirmed.

TABLE 1

| | Polymerizable Composition | Refractive Index ne | Hue | Optical Strain |
|---|---|---|---|---|
| Example 1 | 0 mass percent of compounds (c) and (e) contained in polymerizable composition | 1.744 | Blank | o (good) |
| Example 2 | 0.8 mass percent of compounds (c) and (e) contained in polymerizable composition | 1.744 | o (good) | o (good) |
| Example 4 | 0.7 mass percent of compounds (c) and (e) contained in polymerizable composition | 1.744 | o (good) | o (good) |
| Example 6 | 0 mass percent of compounds (d) and (f) contained in polymerizable composition | 1.705 | Blank | o (good) |
| Example 7 | 0.9 mass percent of compounds (d) and (f) contained in polymerizable composition | 1.705 | o (good) | o (good) |
| Example 9 | 1.2 mass percent of compounds (d) and (f) contained in polymerizable composition | 1.705 | o (good) | o (good) |
| Example 11 | 1.4 mass percent of compounds (d) and (f) contained in polymerizable composition | 1.705 | o (good) | o (good) |
| Example 13 | 1.2 mass percent of compounds (d) and (f) contained in polymerizable composition | 1.705 | o (good) | o (good) |
| Comparative Example 1 | 4.2 mass percent of compounds (c) and (e) contained in polymerizable composition | 1.747 | x (not good) | x (not good) |
| Comparative Example 3 | 5.6 mass percent of compounds (d) and (f) contained in polymerizable composition | 1.702 | x (not good) | x (not good) |
| Comparative Example 5 | 5.2 mass percent of compounds (d) and (f) contained in polymerizable composition | 1.708 | x (not good) | x (not good) |

INDUSTRIAL APPLICABILITY

According to the present invention, a transparent cured resin used as an optical material in the field of ultra high refractive index application can be obtained in which variation in refractive index and variation in optical strain are suppressed, and as a result, in the field of glass lenses, the yield of lenses can be improved.

The invention claimed is:

1. A method for manufacturing a polymerizable composition comprising a compound which has at least one structure represented by formula (1), comprising forming a polythioepoxy compound from a polyepoxy compound, wherein a thiation agent in an amount of 0.9 to 1.3 equivalents is used with respect to one epoxy equivalent of the polyepoxy compound so that the total of a thioepoxy compound A which has at least one structure represented by formula (2) and at least one structure represented by formula (3), and a thioepoxy compound B which has at least one structure represented by formula (4) and at least one structure represented by formula (3), which are in the polymerizable composition, is 4 mass percent or less with respect to the total mass of the polymerizable composition, wherein formulae (1) to (4) are as follows:

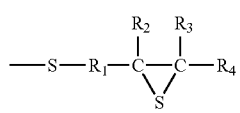
(1)

(where $R_1$ represents a hydrocarbon having 1 to 10 carbon atoms, $R_2$, $R_3$, and $R_4$ each represent a hydrocarbon group having 1 to 10 carbon atoms or a hydrogen atom)

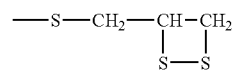
(2)

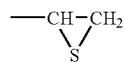
(3)

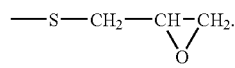
(4)

2. The manufacturing method according to claim 1, wherein the thioepoxy compound A is a compound represented by formula (5), the thioepoxy compound B is a compound represented by formula (6), and a compound having at least one structure represented by formula (1) is represented by formula (7):

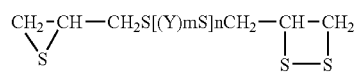
(5)

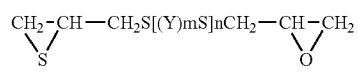
(6)

(where Y represents a substituted or unsubstituted, linear, branched, or cyclic divalent aliphatic hydrocarbon group having 1 to 10 carbon atoms, a substituted or unsubstituted 1,4-dithiane group, an arylene group, or an aralkylene group, m represents an integer of 0 to 2, and n represents an integer of 0 to 4)

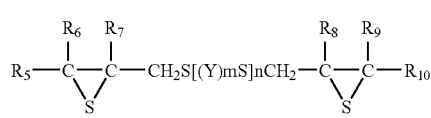
(7)

(where $R_5$ to $R_{10}$ each represent a hydrocarbon group having 1 to 10 carbon atoms or hydrogen, Y represents a substituted or unsubstituted, linear, branched, or cyclic divalent hydrocarbon group having 1 to 10 carbon atoms, a substituted or unsubstituted 1,4-dithiane group, an arylene group, or an aralkylene group, m represents an integer of 0 to 2, and n represents an integer of 0 to 4).

3. The manufacturing method according to claim 2, wherein the thioepoxy compound A comprises 2,3-epidithiopropyl(2,3-epithiopropyl)disulfide and/or 2,3-epidithiopropyl(2,3-epithiopropyl)sulfide, the thioepoxy compound B comprises 2,3-epoxypropyl(2,3-epithiopropyl)disulfide and/or 2,3-epoxypropyl(2,3-epithiopropyl)sulfide, and the compound represented by formula (7) comprises bis(2,3-epithiopropyl)disulfide and/or bis(2,3-epithiopropyl)sulfide.

4. A method for manufacturing a polymerizable composition comprising a compound which has at least one structure represented by formula (1), comprising forming a polythioepoxy compound from a polyepoxy compound, wherein a thiation agent in an amount of 0.9 to 1.3 equivalents is used with respect to one epoxy equivalent of the polyepoxy compound, and the reaction temperature is set to 0° C. to 50° C. so that the total of a thioepoxy compound A which has at least one structure represented by formula (2) and at least one structure represented by formula (3), and a thioepoxy compound B which has at least one structure represented by formula (4) and at least one structure represented by formula (3), which are in the polymerizable composition, is 4 mass percent or less with respect to the total mass of the polymerizable composition, wherein formulae (1) to (4) are as follows:

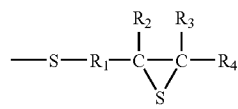
(1)

(where $R_1$ represents a hydrocarbon having 1 to 10 carbon atoms, $R_2$, $R_3$, and $R_4$ each represent a hydrocarbon group having 1 to 10 carbon atoms or a hydrogen atom)

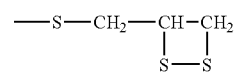
(2)

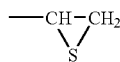
(3)

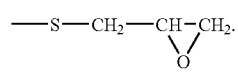
(4)

5. The manufacturing method according to claim 4, wherein the thioepoxy compound A is a compound represented by formula (5), the thioepoxy compound B is a compound represented by formula (6), and a compound having at least one structure represented by formula (1) is represented by formula (7):

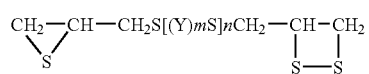
(5)

-continued

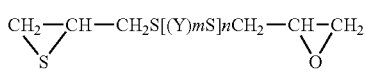
(6)

(where Y represents a substituted or unsubstituted, linear, branched, or cyclic divalent aliphatic hydrocarbon group having 1 to 10 carbon atoms, a substituted or unsubstituted 1,4-dithiane group, an arylene group, or an aralkylene group, m represents an integer of 0 to 2, and n represents an integer of 0 to 4)

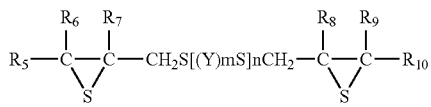
(7)

(where $R_5$ to $R_{10}$ each represent a hydrocarbon group having 1 to 10 carbon atoms or hydrogen, Y represents a substituted or unsubstituted, linear, branched, or cyclic divalent hydrocarbon group having 1 to 10 carbon atoms, a substituted or unsubstituted 1,4-dithiane group, an arylene group, or an aralkylene group, m represents an integer of 0 to 2, and n represents an integer of 0 to 4).

6. The manufacturing method according to claim 5, wherein the thioepoxy compound A comprises 2,3-epidithiopropyl(2,3-epithiopropyl)disulfide and/or 2,3-epidithiopropyl(2,3-epithiopropyl)sulfide, the thioepoxy compound B comprises 2,3-epoxypropyl(2,3-epithiopropyl)disulfide and/or 2,3-epoxypropyl(2,3-epithiopropyl)sulfide, and the compound represented by formula (7) comprises bis(2,3-epithiopropyl)disulfide and/or bis(2,3-epithiopropyl)sulfide.

7. A method for manufacturing a polymerizable composition comprising a compound which has at least one structure represented by formula (1), comprising forming a polythioepoxy compound from a polyepoxy compound, wherein a thiation agent in an amount of 0.9 to 1.3 equivalents is used with respect to one epoxy equivalent of the polyepoxy compound, an acid or its anhydride in an amount of 0.2 equivalents or less is used with respect to one epoxy equivalent of the polyepoxy compound, and the reaction temperature is set to 0° C. to 50° C. so that the total of a thioepoxy compound A which has at least one structure represented by formula (2) and at least one structure represented by formula (3), and a thioepoxy compound B which has at least one structure represented by formula (4) and at least one structure represented by formula (3), which are in the polymerizable composition, is 4 mass percent or less with respect to the total mass of the polymerizable composition, wherein formulae (1) to (4) are as follows:

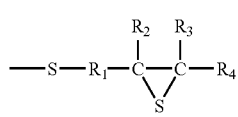
(1)

(where $R_1$ represents a hydrocarbon having 1 to 10 carbon atoms, $R_2$, $R_3$, and $R_4$ each represent a hydrocarbon group having 1 to 10 carbon atoms or a hydrogen atom)

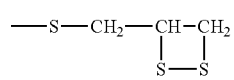
(2)

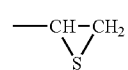
(3)

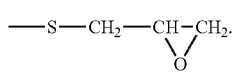
(4)

8. The manufacturing method according to claim 7, wherein the thioepoxy compound A is a compound represented by formula (5), the thioepoxy compound B is a compound represented by formula (6), and a compound having at least one structure represented by formula (1) is represented by formula (7):

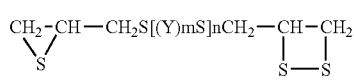
(5)

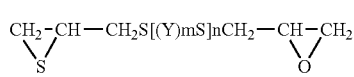
(6)

(where Y represents a substituted or unsubstituted, linear, branched, or cyclic divalent aliphatic hydrocarbon group having 1 to 10 carbon atoms, a substituted or unsubstituted 1,4-dithiane group, an arylene group, or an aralkylene group, m represents an integer of 0 to 2, and n represents an integer of 0 to 4)

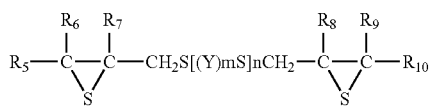
(7)

(where $R_5$ to $R_{10}$ each represent a hydrocarbon group having 1 to 10 carbon atoms or hydrogen, Y represents a substituted or unsubstituted, linear, branched, or cyclic divalent hydrocarbon group having 1 to 10 carbon atoms, a substituted or unsubstituted 1,4-dithiane group, an arylene group, or an aralkylene group, m represents an integer of 0 to 2, and n represents an integer of 0 to 4).

9. The manufacturing method according to claim 8, wherein the thioepoxy compound A comprises 2,3-epidithiopropyl(2,3-epithiopropyl)disulfide and/or 2,3-epidithiopropyl(2,3-epithiopropyl)sulfide, the thioepoxy compound B comprises 2,3-epoxypropyl(2,3-epithiopropyl)disulfide and/or 2,3-epoxypropyl(2,3-epithiopropyl)sulfide, and the compound represented by formula (7) comprises bis(2,3-epithiopropyl)disulfide and/or bis(2,3-epithiopropyl)sulfide.

* * * * *